(12) United States Patent
Wang et al.

(10) Patent No.: US 8,711,882 B2
(45) Date of Patent: Apr. 29, 2014

(54) REFRAMING CIRCUITRY WITH VIRTUAL CONTAINER DROP AND INSERT FUNCTIONALITY TO SUPPORT CIRCUIT EMULATION PROTOCOLS

(75) Inventors: Tao Wang, Shanghai (CN); Yifan Lin, Shanghai (CN); Lin Sun, Shanghai (CN); Hao Li, Shanghai (CN)

(73) Assignee: LSI Corporation, San Jose, CA (US)

( * ) Notice: Subject to any disclaimer, the term of this patent is extended or adjusted under 35 U.S.C. 154(b) by 116 days.

(21) Appl. No.: 13/336,160

(22) Filed: Dec. 23, 2011

(65) Prior Publication Data
US 2013/0163612 A1 Jun. 27, 2013

(51) Int. Cl.
*H04J 3/00* (2006.01)
(52) U.S. Cl.
USPC ....... 370/476; 370/389; 370/394; 370/395.51
(58) Field of Classification Search
USPC ......... 370/412, 442, 428, 458, 466, 389, 394, 370/395.51, 467, 476
See application file for complete search history.

(56) References Cited

U.S. PATENT DOCUMENTS

| | | | |
|---|---|---|---|
| 5,267,239 A | 11/1993 | Pospischil et al. | |
| 5,784,380 A * | 7/1998 | Kuwahara | 370/509 |
| 6,011,802 A * | 1/2000 | Norman | 370/466 |
| 6,556,593 B1 | 4/2003 | Herkersdorf et al. | |
| 6,697,386 B2 * | 2/2004 | Sugawara et al. | 370/535 |
| 6,700,900 B1 * | 3/2004 | Turban | 370/465 |
| 6,898,213 B1 | 5/2005 | Shimelmitz et al. | |
| 7,002,956 B2 * | 2/2006 | Banerjee et al. | 370/389 |
| 7,006,525 B1 * | 2/2006 | Jha | 370/466 |
| 7,277,459 B1 * | 10/2007 | Abbas | 370/539 |
| 7,353,288 B1 * | 4/2008 | Rangavajjhala et al. | 709/236 |
| 7,362,777 B2 | 4/2008 | Fisher et al. | |
| 7,443,888 B2 * | 10/2008 | Surek | 370/503 |
| 7,606,224 B2 * | 10/2009 | Notani et al. | 370/386 |

(Continued)

FOREIGN PATENT DOCUMENTS

EP 0552694 B1 1/2002

OTHER PUBLICATIONS

N.L.V. Calazans et al., "Design, Validation and Prototyping of the EMS SDH STM-1 Mapper Soft-core," 6th IEEE Latin American Test Workshop (LATW), Mar.-Apr. 2005, pp. 313-318, Salvador, Brazil.

(Continued)

*Primary Examiner* — Ricky Ngo
*Assistant Examiner* — Dewanda Samuel
(74) *Attorney, Agent, or Firm* — Ryan, Mason & Lewis, LLP

(57) ABSTRACT

Reframing circuitry controls communications between a physical layer device and a link layer device. In a first direction of communication, the reframing circuitry receives a container frame with the container frame having a first arrangement of columns, and outputs a virtual container frame that includes a modified version of the container frame received by the reframing circuitry, with the modified version of the container frame having a second arrangement of columns different than the first arrangement of columns. For example, the reframing circuitry in generating the modified version of the container frame may remove a path overhead column of the container frame and replace that path overhead column with a stuff column in the modified version of the container frame. The virtual container frame may be configured to include the path overhead column that was removed from the container frame in generating the modified version of the container frame.

20 Claims, 8 Drawing Sheets

(56) References Cited

U.S. PATENT DOCUMENTS

| | | | |
|---|---|---|---|
| 7,619,978 B2 * | 11/2009 | Imazeki | 370/241 |
| 7,656,891 B1 * | 2/2010 | Calderon et al. | 370/442 |
| 7,742,493 B2 | 6/2010 | Duan et al. | |
| 7,852,881 B2 | 12/2010 | Schumann-Olsen | |
| 8,111,717 B2 * | 2/2012 | Giannakopoulos | 370/476 |
| 2003/0048813 A1 * | 3/2003 | Lahav et al. | 370/537 |
| 2003/0112833 A1 * | 6/2003 | Kamiya | 370/535 |
| 2004/0170166 A1 * | 9/2004 | Cohen | 370/389 |
| 2009/0115596 A1 | 5/2009 | Duan et al. | |
| 2010/0329122 A1 | 12/2010 | Duan et al. | |
| 2010/0329245 A1 | 12/2010 | Bordogna et al. | |
| 2010/0329673 A1 | 12/2010 | Duan et al. | |
| 2011/0142036 A1 | 6/2011 | Kim et al. | |

OTHER PUBLICATIONS

C.A.M. Marcon et al., "Design and Prototyping of an SDH-E1 Mapper Soft-Core," Revista da Sociedade Brasileira de Telecomunicações (currently called Journal of Communication and Information Systems (JCIS)), Aug. 2005, pp. 26-36, vol. 20, No. 2, Campinas.

D. Torres et al., "A 2.5 Gbps SONET STS-48/SDH STM-16 Add Drop Multiplexer," 8th International Workshop Iberchip (IWS2002), Apr. 2002, 8 pages, Guadalajara, Mexico.

A. Malis et al., "Synchronous Optical Network/Synchronous Digital Hierarchy (SONET/SDH) Circuit Emulation Over Packet (CEP)," Network Working Group, Request for Comments: 4842, Category: Standards Track, Apr. 2007, 43 pages.

Agere Systems, "TMXF84622 Ultramapper 622/155 Mbits/s SONET SDX x DS3/E3/DS2/DS1/E1/DS0," Ultramapper Resource Document, Jun. 2002, pp. 1-250.

International Telecommunication Union, "Network Node Interface for the Synchronous Digital Hierarchy (SDH)," ITU-T Recommendation G.707/Y.1322, Series G: Transmission Systems and Media, Digital Systems and Networks, Digital Terminal Equipments—General, Series Y: Global Information Infrastructure, Internet Protocol Aspects and Next Generation Networks, Dec. 2003, 192 pages.

International Telecommunication Union, "Sub STM-0 Network Node Interface for the Synchronous Digital Hierarchy (SDH)," ITU-T Recommendation G.708, Series G: Transmission Systems and Media, Digital Systems and Networks, Digital Transmission Systems—Terminal Equipments—General, Jun. 1999, 23 pages.

\* cited by examiner

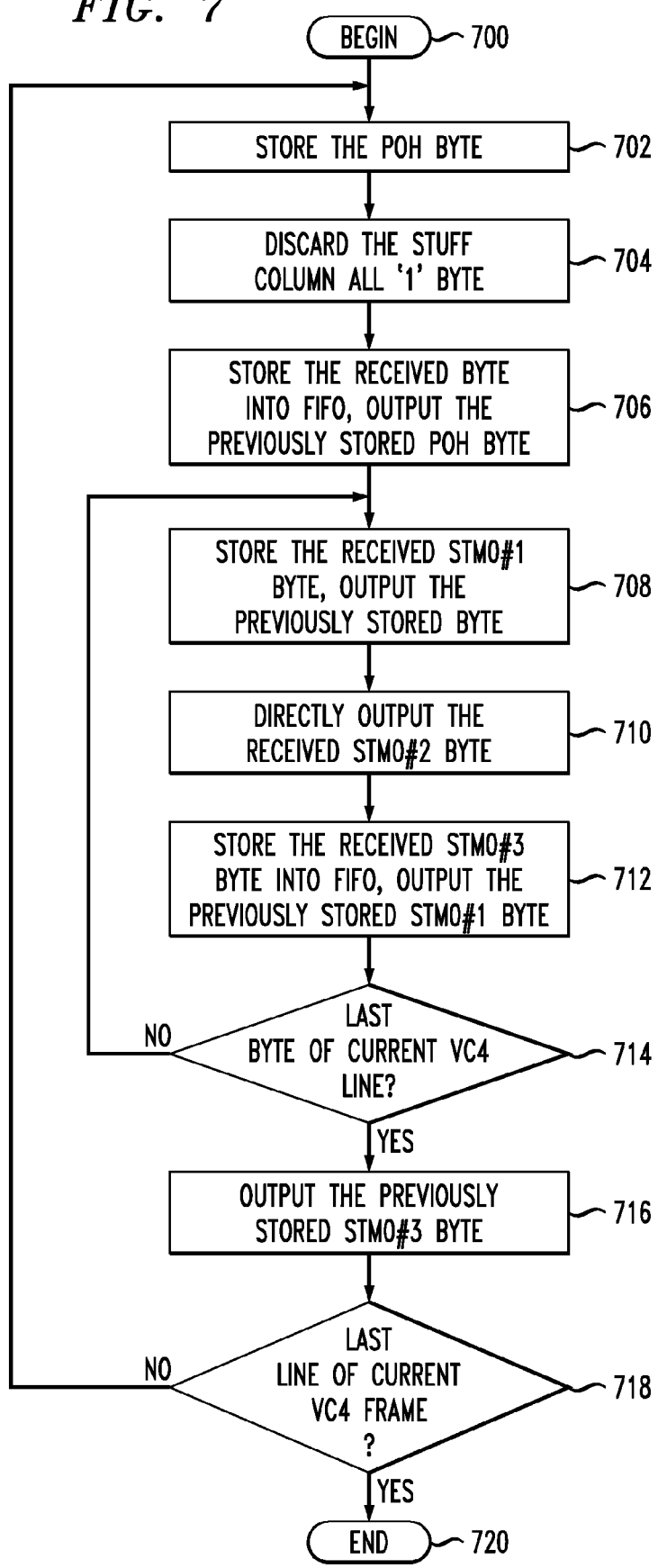

REFRAMING CIRCUITRY WITH VIRTUAL CONTAINER DROP AND INSERT FUNCTIONALITY TO SUPPORT CIRCUIT EMULATION PROTOCOLS

FIELD

The field relates generally to network-based communication systems, and more particularly to communication devices which process overhead information or other framing information in such systems.

BACKGROUND

Conventional network-based communication systems include systems configured to operate in accordance with well-known synchronous transport standards, such as the synchronous optical network (SONET) and synchronous digital hierarchy (SDH) standards.

The SONET standard was developed by the Exchange Carriers Standards Association (ECSA) for the American National Standards Institute (ANSI), and is described in the document ANSI T1.105-1988, entitled "American National Standard for Telecommunications—Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are incorporated by reference herein.

The basic unit of transmission in the SONET standard is referred to as synchronous transport signal level-1 (STS1). It has a serial transmission rate of 51.84 Megabits per second (Mbps). The corresponding unit in the SDH standard is referred to as synchronous transport module level-0 (STM0). Synchronous transport signals at higher levels comprise multiple STS1 or STM0 signals. For example, an intermediate unit of transmission in the SONET standard is referred to as synchronous transport signal level-3 (STS3). It has a serial transmission rate of 155.52 Mbps. The corresponding unit in the SDH standard is referred to as STM1.

A given STS3 or STM1 signal is organized in frames having a duration of 125 microseconds, each of which may be viewed as comprising nine rows by 270 columns of bytes, for a total frame capacity of 2,430 bytes per frame. The first nine bytes of each row comprise transport overhead (TOH), while the remaining 261 bytes of each row are referred to as a synchronous payload envelope (SPE). Synchronous transport via SONET or SDH generally involves a hierarchical arrangement in which an end-to-end path may comprise multiple lines with each line comprising multiple sections. The TOH includes section overhead (SOH), pointer information, and line overhead (LOH). The SPE includes path overhead (POH). Additional details regarding signal and frame formats can be found in the above-cited standards documents.

In conventional SONET or SDH network-based communication systems, synchronous transport signals like STS3 or STM1 are mapped to or from corresponding higher-rate optical signals such as a SONET OC-12 signal or an SDH STM4 signal. An OC-12 optical signal carries four STS3 signals, and thus has a rate of 622.08 Mbps. The SDH counterpart to the OC-12 signal is the STM4 signal, which carries four STM1 signals, and thus also has a rate of 622.08 Mbps. The mapping of these and other synchronous transport signals to or from higher-rate optical signals generally occurs in a physical layer device commonly referred to as a mapper, which may be used to implement an add-drop multiplexer (ADM) or other node of a SONET or SDH communication system.

Such a mapper typically interacts with a link layer processor. A link layer processor is one example of what is more generally referred to herein as a link layer device, where the term "link layer" generally denotes a switching function layer. Another example of a link layer device is a field programmable gate array (FPGA). These and other link layer devices can be used to implement processing associated with various packet-based protocols, such as Internet Protocol (IP) and Asynchronous Transfer Mode (ATM), as well as other protocols, such as Fiber Distributed Data Interface (FDDI). A given mapper or link layer device is often implemented in the form of an integrated circuit.

In many communication system applications, it is necessary to carry circuit-switched traffic such as T1/E1 traffic over a packet network such as an IP network or an ATM network. For example, T1/E1 traffic from a SONET/SDH network or other circuit-switched network may be carried using virtual containers (VCs) that are mapped to packets of an IP network or other packet network. Such VCs contain both POH and payload information. The first column of a given VC is used for the POH, and the remaining 260 columns are the payload, which may comprise one or more containers.

The mapping of VCs or other time-division multiplexed (TDM) data to IP packets or other types of packets may be performed in accordance with a circuit emulation protocol, such as the CEP protocol described in IETF RFC 4842, "Synchronous Optical Network/Synchronous Digital Hierarchy (SONET/SDH) Circuit Emulation over Packet (CEP)," April 2007, which is incorporated by reference herein.

SUMMARY

One or more illustrative embodiments of the invention provide synchronous transport signal mappers or other communication devices that are configured to perform drop and insert of overhead information, such as POH information associated with a VC within a given frame of a synchronous transport signal, in a manner that facilitates the mapping of VCs or other TDM data to packets for transmission over a packet network. For example, a given such embodiment allows a synchronous transport signal mapper that does not otherwise support drop and insert of POH information associated with VCs to nonetheless provide that functionality, thereby permitting the mapping of the VCs to packets in accordance with a circuit emulation protocol such as the above-noted CEP protocol.

In one embodiment, reframing circuitry controls one or more communications between a physical layer device and a link layer device. In a first direction of communication, which may be a drop path direction of communication between the physical layer device and the link layer device, the reframing circuitry receives a container frame with the container frame having a first arrangement of columns, and outputs a VC frame that includes a modified version of the container frame received by the reframing circuitry, with the modified version of the container frame having a second arrangement of columns different than the first arrangement of columns.

For example, the reframing circuitry in generating the modified version of the container frame may remove a POH column of the container frame and replace that POH column with a stuff column in the modified version of the container frame. The VC frame in this example is configured to include the POH column that was removed from the container frame in generating the modified version of the container frame. The reframing circuitry in generating the modified version of the container frame may also reorder multiple synchronous transport signal data columns of the container frame.

In a second direction of communication, which may be an insert path direction of communication from the link layer device to the physical layer device, the reframing circuitry receives from the link layer device a VC frame comprising a container frame with the container frame having the second arrangement of columns. The reframing circuitry outputs to the physical layer device a modified version of the container frame, with the modified version of the container frame provided by the reframing circuitry to the physical layer device having the first arrangement of columns.

For example, the reframing circuitry in generating the modified version of the container frame may remove a POH column of the VC frame and replace a stuff column of the container frame with the removed POH column in the modified version of the container frame. The reframing circuitry in generating the modified version of the container frame may also reorder multiple synchronous transport signal data columns of the container frame.

Multiplexing circuitry of the physical layer device may be used in conjunction with the reframing circuitry in order to allow an otherwise conventional container frame to be modified to carry a POH column needed to support drop and insert functionality for the VC frame.

Other embodiments may make other types of container frame modifications in order to support virtual container drop and insert functionality.

BRIEF DESCRIPTION OF THE DRAWINGS

FIG. 7 is a flow diagram of an insert path reframing process performed by the reframing circuitry in the FIG. 1 system.

DETAILED DESCRIPTION

Embodiments of the invention will be illustrated herein in conjunction with an exemplary network-based communication system which includes a physical layer device, a link layer device and other elements configured in a particular manner. It should be understood, however, that the disclosed techniques are more generally applicable to any communication system application in which it is desirable to provide virtual container drop and insert functionality to support circuit emulation protocols.

Figure 1:
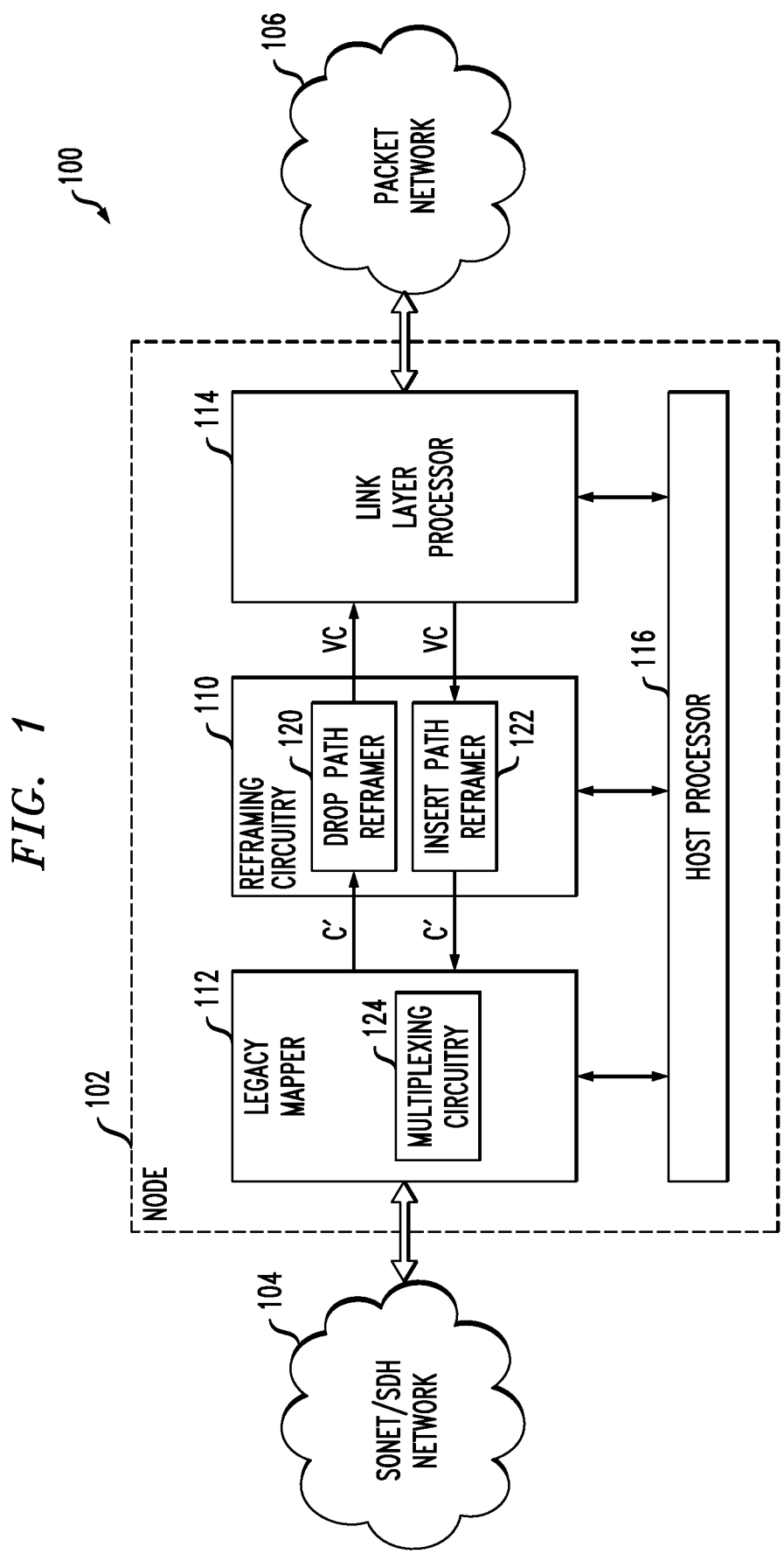
FIG. 1 is a block diagram of a network-based communication system comprising at least one node having reframing circuitry in an illustrative embodiment.

FIG. 1 shows a network-based communication system 100 in an illustrative embodiment. The system 100 includes a node 102 arranged to support communication between a SONET/SDH network 104 and a packet network 106. The packet network 106 may comprise, for example, an IP network, an ATM network or other type of network utilizing packet switching functionality. The networks 104 and 106 may comprise routers, switches or other network elements of respective SONET/SDH and packet networks operating in accordance with known standards. It should be noted that the term "SONET/SDH" as used herein refers to SONET and/or SDH. Embodiments to be described herein with reference to SDH synchronous transport signal terminology such as STM0 and STM1 should be understood to encompass analogous SONET embodiments using corresponding synchronous transport signal terminology such as STS1 and STS3.

Although shown in the figure as being separate from the networks 104 and 106, the node 102 may be viewed as being part of one of the networks 104 or 106. For example, the node 102 may comprise an edge node of network 104 or network 106. Alternatively, the node may represent a standalone router, switch, network element or other communication device arranged between nodes of the networks 104 and 106.

The node 102 of system 100 comprises reframing circuitry 110 coupled between a mapper 112 and a link layer processor 114. The node 102 also includes a host processor 116 that is used to configure and control one or more of reframing circuitry 110, mapper 112 and link layer processor 114. Portions of the host processor functionality may be incorporated into one or more of elements 110, 112 or 114 in other embodiments. Also, although the reframing circuitry 110 is shown in FIG. 1 as being separate from the mapper 112 and link layer processor 114, in other embodiments the reframing circuitry 110 may be implemented at least in part within at least one of the mapper 112 and the link layer processor 114. Accordingly, it is to be appreciated that reframing circuitry incorporated into mapper 112 or link layer processor 114 may be used to control one or more communications between those devices.

The reframing circuitry 110, mapper 112, link layer processor 114, and host processor 116 in this illustrative embodiment may be installed on a line card or other circuit structure of the node 102. Each of the elements 110, 112, 114 and 116 may be implemented as a separate integrated circuit, or one or more of the elements may be combined into a single integrated circuit. Various elements of the system 100 may therefore be implemented, by way of example and without limitation, utilizing a microprocessor, an FPGA, an application-specific integrated circuit (ASIC), a system-on-chip (SOC) or other type of data processing device, as well as portions or combinations of these and other devices. One or more other nodes of the system 100 in one or both of networks 104 and 106 may each be implemented in a manner similar to that shown for node 102 in FIG. 1.

The reframing circuitry controls certain communications between the mapper 112 and the link layer processor 114, in order to allow the mapper 112 to communicate with a virtual container (VC) interface of the link layer processor 114. The mapper 112 and link layer processor 114 are examples of what are more generally referred to herein as physical layer devices and link layer devices, respectively. The term "physical layer device" as used herein is intended to be construed broadly so as to encompass any device which provides an interface between a link layer device and a physical transmission medium of a network-based system. The term "link layer device" is also intended to be construed broadly, and should be understood to encompass any type of processor which performs processing operations associated with a link layer of a network-based system.

The mapper 112 and link layer processor 114 may include functionality of a conventional type. Such functionality, being well known to those skilled in the art, will not be described in detail herein, but may include functionality associated with known mappers, such as the LSI Hypermapper™, Ultramapper™ and Supermapper™ devices, and known link layer devices, such as the LSI Link Layer Processor. These LSI devices are commercially available from LSI Corporation of Milpitas, Calif., U.S.A.

The node 102 may also include other processing devices not explicitly shown in the figure. For example, the node may comprise a conventional network processor such as an LSI Advanced PayloadPlus® network processor in the APP300, APP500 or APP650 product family, also commercially available from LSI Corporation.

In this embodiment, the mapper 112 is more particularly referred to as a "legacy" mapper. This is intended to denote a mapper that has a container frame interface but not a VC frame interface, such that the mapper would not otherwise be able to communicate with a VC frame interface of the link layer processor 114, and therefore could not be used to support the mapping of VCs to packets using a circuit emulation protocol, such as the CEP protocol described in IETF RFC 4842. Additional details regarding conventional aspects of a legacy mapper can be found in, for example, TMXF84622 Ultramapper™ 622/155 Mbits/s SONET/SDH×DS3/E3/DS2/DS1/E1/DS0, Ultramapper™ Resource Document, Jun. 6, 2002, which is incorporated by reference herein.

Although only single instances of the reframing circuitry 110, mapper 112 and link layer processor 114 are shown in the FIG. 1 embodiment, other embodiments may comprise instances of these and other system elements. For example, a group of multiple mappers may be arranged in a master-slave configuration that includes at least one master mapper and a plurality of slave mappers. Other embodiments may include only a single slave mapper, rather than multiple slave mappers. Numerous other configurations of system elements are possible, as will be appreciated by those skilled in the art.

The reframing circuitry 110 is coupled between the legacy mapper 112 and the link layer processor 114 and includes a drop path reframer 120 and an insert path reframer 122. The drop path refers to a direction of communication through node 102 from the SONET/SDH network 104 to the packet network 106, and the insert path refers to a direction of communication through node 102 from the packet network 106 to the SONET/SDH network 104. The reframing circuitry 110 operates in conjunction with multiplexing circuitry 124 of the legacy mapper 112 to allow the mapper to communicate with the VC frame interface of the link layer processor 114, and therefore to support the mapping of VCs to packets using the CEP protocol or other circuit emulation protocols.

The multiplexing circuitry 124 is used to control the ordering of columns of a container frame generated by the mapper 112 in the drop path so as to provide an output container frame having an arrangement of columns other than that which would normally be provided by the mapper at its container frame interface. By changing the column arrangement, the legacy mapper 112 can utilize the container frame interface to provide path overhead information to the reframing circuitry 110. The drop path reframer 120 uses the received container frame with the path overhead information to generate a standard VC frame for delivery to the link layer processor 114.

The VC frame provided by the drop path reframer 120 includes not only the path overhead information needed by the VC frame, but also a modified version of the received container frame, with this modified version of the container frame having the arrangement of columns that would normally be provided by the mapper at its container frame interface. Thus, the column arrangement that is normally provided at the output of the legacy mapper 112 in the drop path is altered using the multiplexing circuitry 124 in a manner that allows the path overhead information needed by the VC frame to be included in the container frame that is output from the mapper. The drop path reframer 120 takes this path overhead information from the received container frame, and generates an appropriate VC frame that includes the path overhead information as well as a standard container frame that does not include the path overhead information.

In the insert path, the process is reversed. The link layer processor 114 provides a standard VC frame to the insert path reframer 122. This standard VC frame includes path overhead information, but as a separate column and not as part of its associated container frame. The insert path reframer 122 takes the path overhead information from its position in the standard VC frame and provides an input container frame to the legacy mapper 112. The input container frame provided by the insert path reframer 122 to the legacy mapper 112 has an arrangement of columns other than that which would normally be received by the mapper at its container frame interface, in that one of those columns of the input container frame incorporates the path overhead information taken by the insert path reframer 122 from the standard VC frame. Thus, the container frame column arrangement that is normally expected at the input of the legacy mapper 112 in the insert path is altered by insert path reframer 122 in order to allow the path overhead information to be incorporated. The multiplexing circuitry 124 is then utilized to generate a standard container frame for further processing in the legacy mapper 112.

The operation of the reframing circuitry 110 and multiplexing circuitry 124 will now be described in greater detail with reference to FIGS. 2 through 8.

Figure 2:
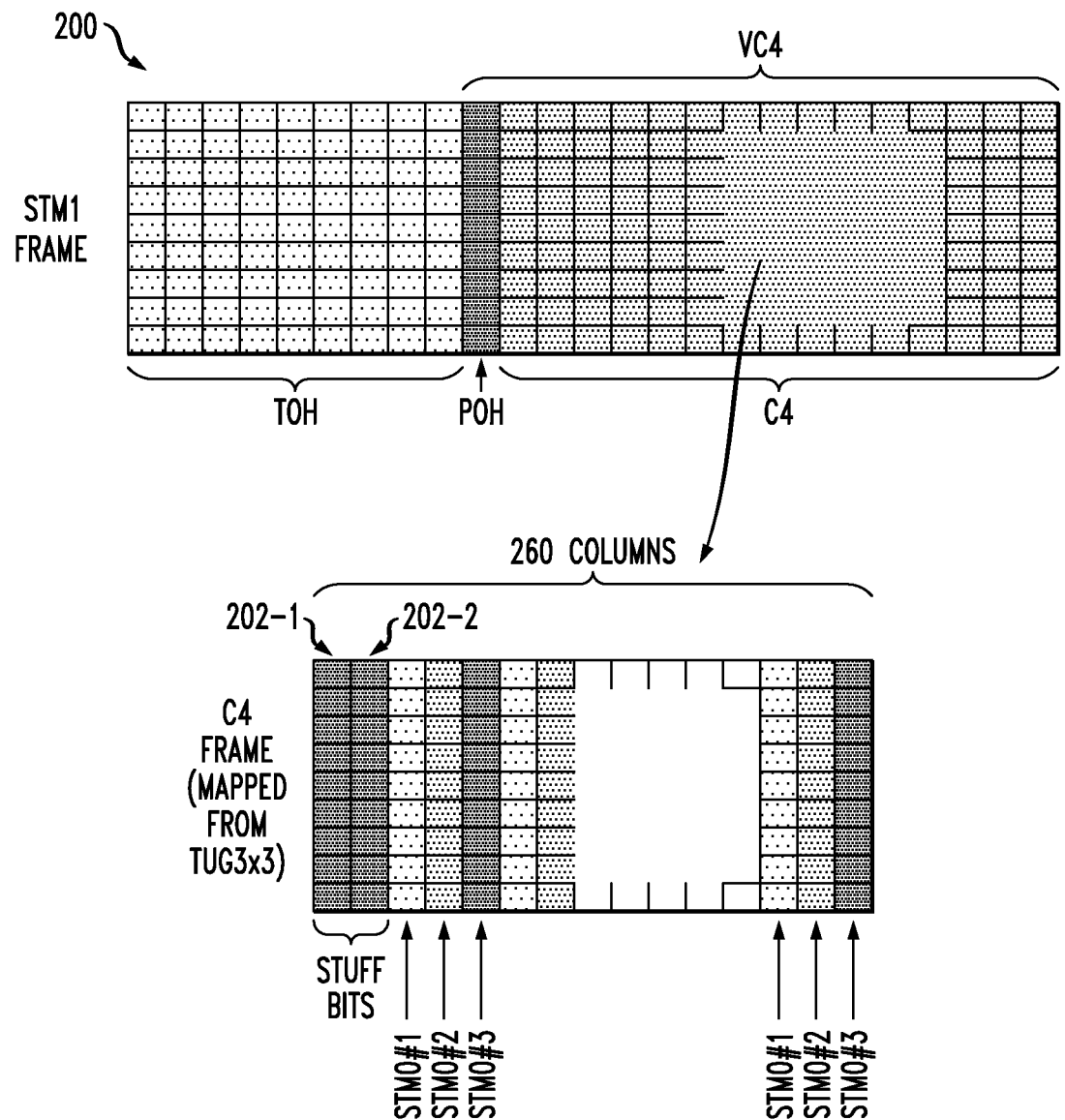
FIG. 2 shows a synchronous transport signal frame processed in the FIG. 1 system.

FIG. 2 illustrates a synchronous transport signal frame 200, in this case an STM1 frame, that includes a virtual container frame denoted VC4. The STM1 frame comprises the data payloads of three STM0 signals, and is organized in the form of array of bytes, having nine rows and 270 columns, such that the entire STM1 frame comprises a total of 2,430 bytes. The first nine bytes of each row of the frame comprise transport overhead (TOH), while the remaining 261 bytes of each row comprise the virtual container frame VC4. The virtual container frame VC4 comprises one column of path overhead (POH), followed by a container frame C4 having 260 columns.

For circuit emulation protocols such as the CEP protocol, the TOH information is not needed, and so SONET/SDH data from the STMT frame is packed into packets using virtual container frames such as VC4.

Virtual container frames such as VC4 may be configured to carry multiple tributary units (TUs) that are arranged in TU groups (TUGs). More specifically, the VC4 frame may comprise three TUG3s (TUG3×3), with each TUG3 possibly having a different arrangement of TUs. In this embodiment, it is assumed that the C4 frame is mapped from a TUG3×3, as indicated in the figure.

The C4 frame has two columns of stuff bits 202-1 and 202-2, also referred to herein as stuff columns and implemented as all logic '1' values. This is followed by a repeating sequence of three STM0 signal byte columns that repeat in the order STM0#1, STM0#2 and STM0#3. This C4 frame format is an example of a standard container frame that would normally be output by the legacy mapper 112 in the drop path and received by the legacy mapper 112 in the insert path. It can be seen that, because the mapper is a legacy mapper as previously described, the mapper does not support direct communication with a virtual container interface of the link layer processor 114, at least in part because the standard C4 frame that it generates or receives does not include the POH information required by the VC4 frame.

This deficiency of the legacy mapper 112 is overcome by using the reframing circuitry 110 in combination with the multiplexing circuitry 124 to provide virtual container drop and insert functionality for the legacy mapper, thereby allowing the mapper to support circuit emulation protocols such as the CEP protocol.

Figure 3:
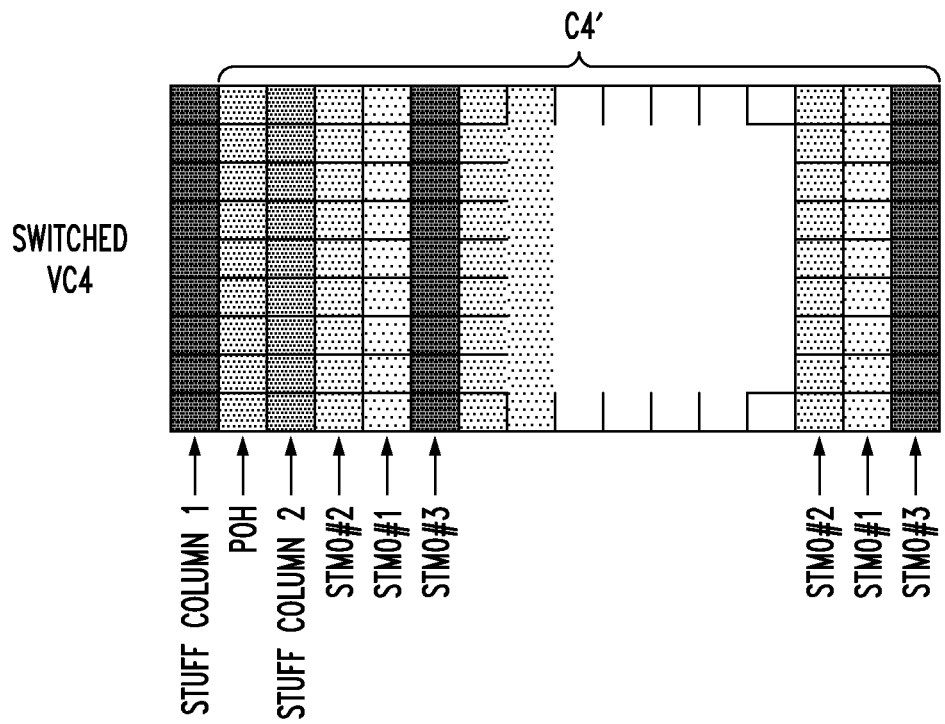
FIG. 3 shows a virtual container frame processed in the FIG. 1 system.

Referring now to FIG. 3, the multiplexing circuitry 124 of mapper 112 is operated to produce in place of the standard container frame C4 a modified container frame C4' in which one of the stuff columns is replaced with the POH column of the virtual container and the STM0 signal byte columns are reordered so as to repeat in a different sequence given by the order STM0#2, STM0#1, STM0#3. It should be noted that this particular reordering is only an example, and other reorderings of the STM0 byte columns could be used in other embodiments, such as the order STM0#2, STM0#3, STM0#1.

The modification of the C4 frame to form the C4' frame may be viewed as producing a switched VC4 frame in each STM0#2 column is switched with the corresponding STM0#1 column and in which the POH column is switched with one of the stuff columns of the C4 frame so as to allow the POH column to be dropped or inserted.

Figure 4A:
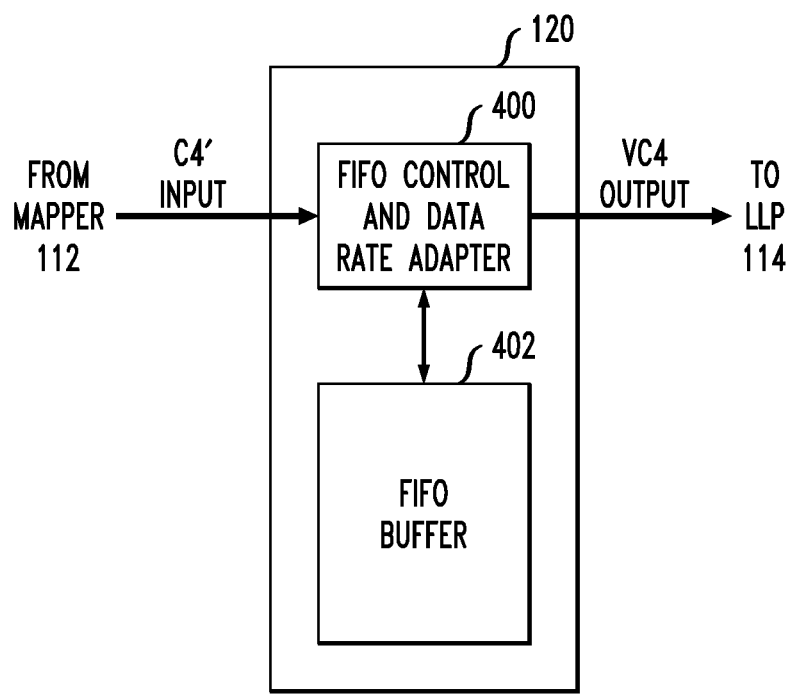
FIG. 4A is a block diagram of a drop path reframer in the reframing circuitry of the FIG. 1 system.

The drop path functionality is illustrated in greater detail in FIGS. 4A-4C and 5. Referring initially to FIG. 4A, the drop path reframer 120 is shown as comprising a FIFO control and data rate adapter 400 coupled to a FIFO buffer 402. The modification of the C4 frame to form the C4' frame is performed by the multiplexing circuitry 124 of mapper 112, and the C4' frame is supplied by the mapper 112 to the drop path reframer 120. The drop path reframer processes the received C4' frame to generate a standard VC4 frame for delivery to the LLP 114. This processing involves removing the POH column from the C4' frame and placing that column in its appropriate position in the VC4 frame, padding out an additional stuff column for the C4 frame portion of the VC4 frame, and reordering the synchronous transport signal data back to the normal ordering of STM0#1, STM0#2, STM0#3.

Figure 4B:
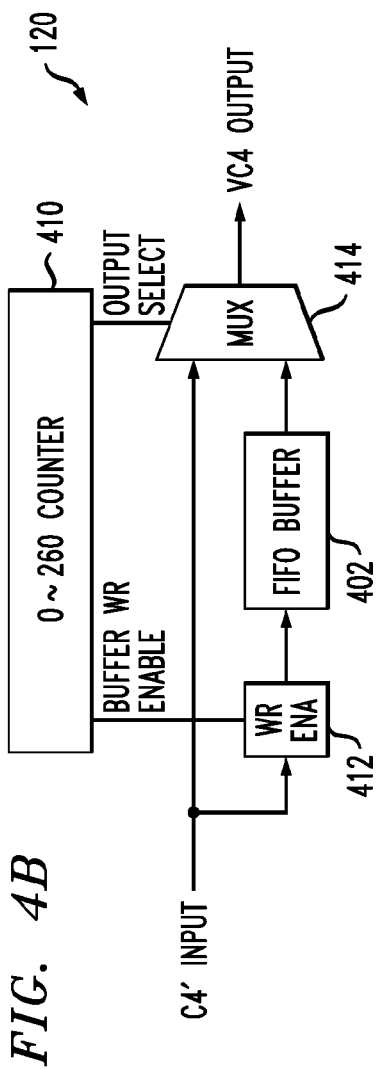
FIG. 4B shows a more detailed view of one possible implementation of the drop path reframer of FIG. 4A.

FIG. 4B shows a more detailed view of the circuitry used to perform the above processing in the drop path reframer 120. In this embodiment, the FIFO control and data rate adapter 402 is more particularly shown as comprising a counter 410, a write enable element 412 coupled to an input of the FIFO buffer 402, and a multiplexer 414. The counter 410 counts from 0 to 260 and generates a buffer write enable signal for application to the write enable element 412 and an output select signal for application to a select line of the multiplexer 414. One of the inputs of the multiplexer 414 is coupled to the C4' input of the drop path reframer 120, and the other input of the multiplexer is coupled to the output of the FIFO buffer 402. The output of the multiplexer 414 provides the VC4 output of the drop path reframer 120.

Figure 4C:
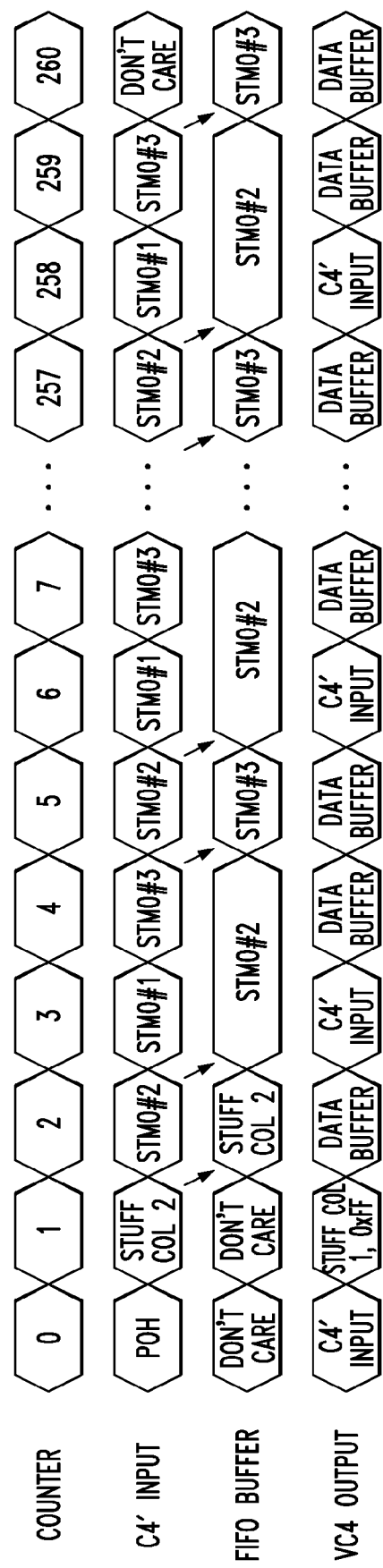
FIG. 4C is a timing diagram illustrating the operation of the drop path reframer of FIG. 4B.

At the C4' input, the drop path reframer 120 receives the C4' frame in the form of a 9 row by 260 column array as shown in FIG. 3. At the VC4 output, the drop path reframer provides a standard VC4 frame in the form of a 9 row by 261 column array as shown in FIG. 2. The C4' frame is received sequentially on a row-by-row basis, where each row corresponds to a line of the frame. Thus, the counter reaches 260 on the last byte of each line of the C4' frame. In this embodiment, the FIFO buffer 402 need only buffer a single byte at a time. The timing diagram of FIG. 4C shows the counter values, C4' input bytes, FIFO buffer contents and VC4 output bytes for the processing of one line of the C4' frame. The other lines of the C4' frame are processed in a similar manner.

Figure 5:
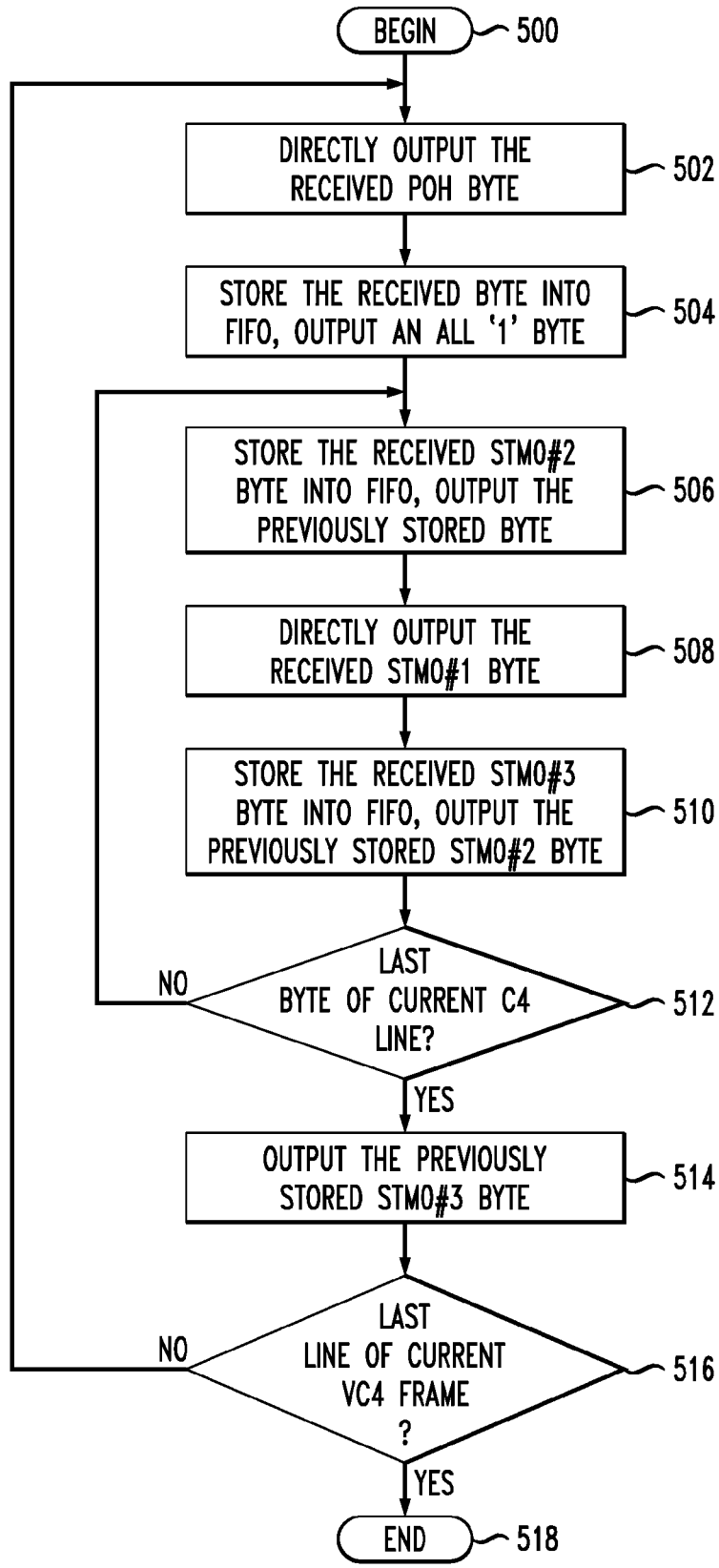
FIG. 5 is a flow diagram of a drop path reframing process performed by the reframing circuitry in the FIG. 1 system.

With reference now to the flow diagram of FIG. 5, the processing of the C4' frame by the drop path reframer 120 to produce the standard VC4 frame is shown. The process includes steps 500 through 518. The process begins in step 500.

The first byte of the received C4' frame is the first POH byte, and this byte is directly output as indicated in step 502.

The second byte of the received C4' frame is the first byte of stuff column 2, and so this byte is stored in the FIFO buffer 402 and an all '1' byte is output to form the first byte of stuff column 1, as indicated in step 504.

The third byte of the received C4' frame is the first byte of STM0#2, and so in step 506 this byte is stored in the FIFO buffer while the previously-stored first byte of stuff column 2 is output from the FIFO buffer.

The fourth byte of the received C4' frame is the first byte of STM0#1, and in step 508 this byte is directly output.

The fifth byte of the received C4' frame is the first byte of STM0#3, and so in step 510 this byte is stored in the FIFO buffer while the previously-stored first byte of STM0#2 is output.

The sixth byte of the received C4' frame is the second byte of STM0#2, so steps 506, 508 and 510 are repeated. These steps will continue to be repeated until it is finally determined in step 512 that the last byte of the first line has been processed. At this point, the previously-stored STM0#3 byte corresponding to the last byte of the VC4 frame is output as indicated in step 514.

After all of the bytes of the first line have been processed, a determination is made in step 516 as to whether or not the current line is the last line of the frame. If not, steps 502 through 516 are repeated for the next line, until the last line has been processed, at which point the process ends in step 518.

Again, since the amount of data to be stored in the FIFO buffer 402 at any given time is only a single byte, the buffer depth need only be one byte. It is therefore apparent that the drop path reframer 120 comprising FIFO buffer 402, counter 410, write enable element 412 and multiplexer 414 exhibits minimal complexity, and can be implemented within limited circuit area and at low cost.

Figure 6A:
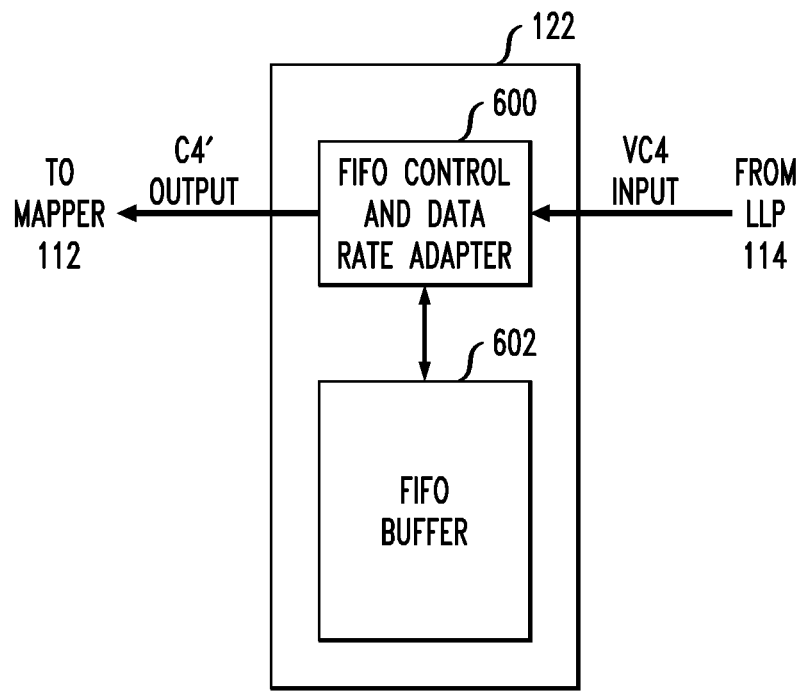
FIG. 6A is a block diagram of an insert path reframer in the reframing circuitry of the FIG. 1 system.

The insert path functionality is illustrated in greater detail in FIGS. 6A-6C and 7. Referring initially to FIG. 6A, the insert path reframer 122 is shown as comprising a FIFO control and data rate adapter 600 coupled to a FIFO buffer 602. The insert path reframer processes the standard VC4 frame received from the LLP 114 to generate a C4' frame for delivery to the legacy mapper 112. This processing involves removing the POH column from the input VC4 frame and placing that column into the output C4' frame in place of one of the stuff columns of a standard C4 frame, and reordering the synchronous transport signal data from the standard C4 ordering of STM0#1, STM0#2, STM0#3 into the modified ordering of STM0#2, STM0#1, STM0#3. The multiplexing circuitry 124 of mapper 112 can then further process the C4' frame received from the insert path reframer 122 in order to form a standard C4 frame of the type shown in FIG. 2.

Figure 6B:
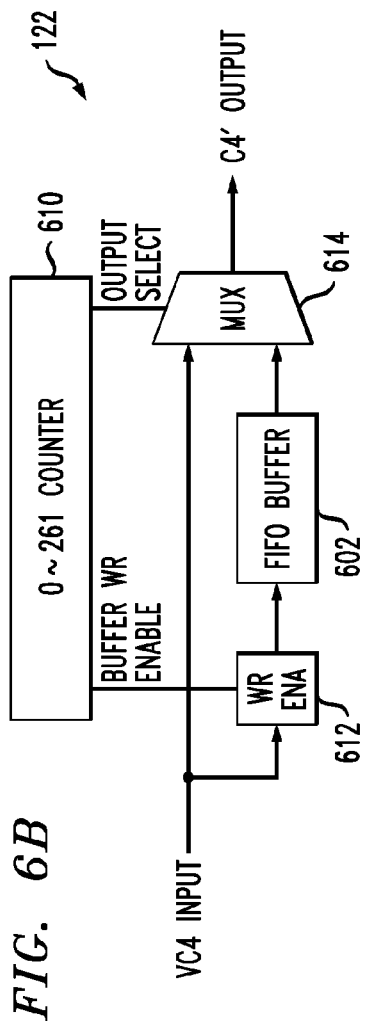
FIG. 6B shows a more detailed view of one possible implementation of the insert path reframer of FIG. 6A.

FIG. 6B shows a more detailed view of the circuitry used to perform the above processing in the insert path reframer 122. In this embodiment, the FIFO control and data rate adapter 602 is more particularly shown as comprising a counter 610, a write enable element 612 coupled to an input of the FIFO buffer 602, and a multiplexer 614. The counter 610 counts from 0 to 261 and generates a buffer write enable signal for application to the write enable element 612 and an output select signal for application to a select line of the multiplexer 614. One of the inputs of the multiplexer 614 is coupled to the VC4 input of the insert path reframer 122, and the other input of the multiplexer is coupled to the output of the FIFO buffer 602. The output of the multiplexer 614 provides the C4' output of the insert path reframer 122.

Figure 6C:
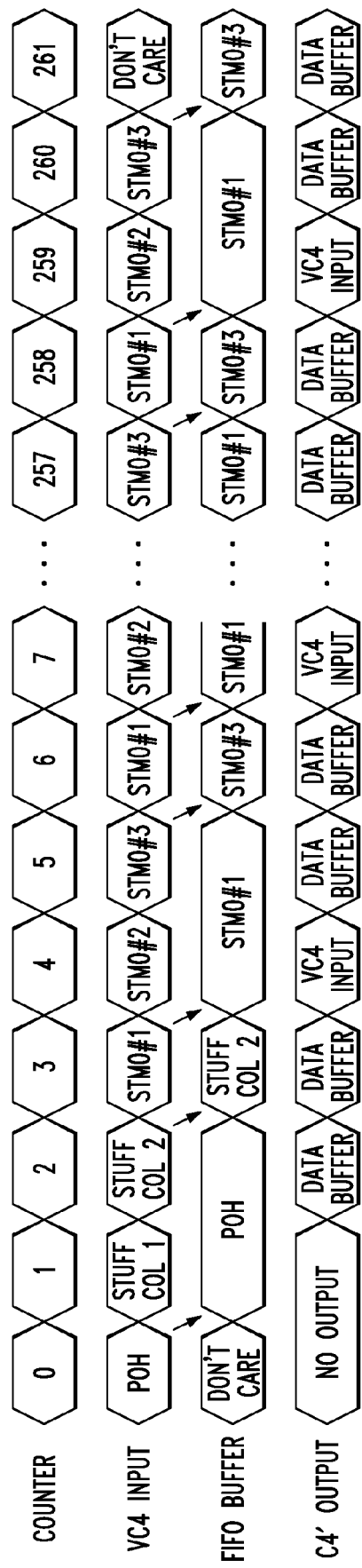
FIG. 6C is a timing diagram illustrating the operation of the insert path reframer of FIG. 6B.

At the VC4 input, the insert path reframer 122 receives the VC4 frame in the form of a 9 row by 261 column array as shown in FIG. 2. At the C4' output, the insert path reframer provides the C4' frame in the form of a 9 row by 260 column array as shown in FIG. 3. The VC4 frame is received sequentially on a row-by-row basis, where each row corresponds to a line of the frame. Thus, the counter reaches 261 on the last byte of each line of the VC4 frame. In this embodiment, the FIFO buffer 602 need only buffer a single byte at a time. The timing diagram of FIG. 6C shows the counter values, VC4 input bytes, FIFO buffer contents and C4' output bytes for the processing of one line of the VC4 frame. The other lines of the VC4 frame are processed in a similar manner.

With reference now to the flow diagram of FIG. 7, the processing of the standard VC4 frame by the insert path reframer 122 to produce the C4' frame is shown. The process includes steps 700 through 720. The process begins in step 700.

The first byte of the received VC4 frame is the first POH byte, and this byte is stored in the FIFO buffer as indicated in step 702.

The second byte of the received VC4 frame is the first byte of stuff column 1. This byte is discarded in step 704 as it is not needed in the C4' frame.

The third byte of the received VC4 frame is the first byte of stuff column 2, and so in step 706 this byte is stored in the FIFO buffer while the previously-stored first byte of POH is output from the FIFO buffer.

The fourth byte of the received VC4 frame is the first byte of STM0#1, and in step 708 this byte is stored in the FIFO buffer, while the previously-stored first byte of stuff column 2 is output.

The fifth byte of the received VC4 frame is the first byte of STM0#2, and so in step 710 this byte is directly output.

The sixth byte of the received VC4 frame is the first byte of STM0#3. This byte is stored in the FIFO buffer, while the previously-stored first byte of STM0#1 is output, as indicated in step 712.

Step 714 determines if the current byte is the last byte of the first line of the VC4 frame. If it is not the last byte, steps 708, 710 and 712 are repeated. These steps will continue to be repeated until it is finally determined in step 714 that the last byte of the first line has been processed. At this point, the previously-stored STM0#3 byte corresponding to the last byte of the C4' frame is output as indicated in step 716.

After all of the bytes of the first line have been processed, a determination is made in step 718 as to whether or not the current line is the last line of the frame. If not, steps 702 through 718 are repeated for the next line, until the last line has been processed, at which point the process ends in step 720.

As in drop path reframer 120, the amount of data to be stored in the FIFO buffer 602 at any given time is only a single byte, and therefore the buffer depth need only be one byte. The insert path reframer 122 can therefore also be implemented within limited circuit area and at low cost.

Figure 8:
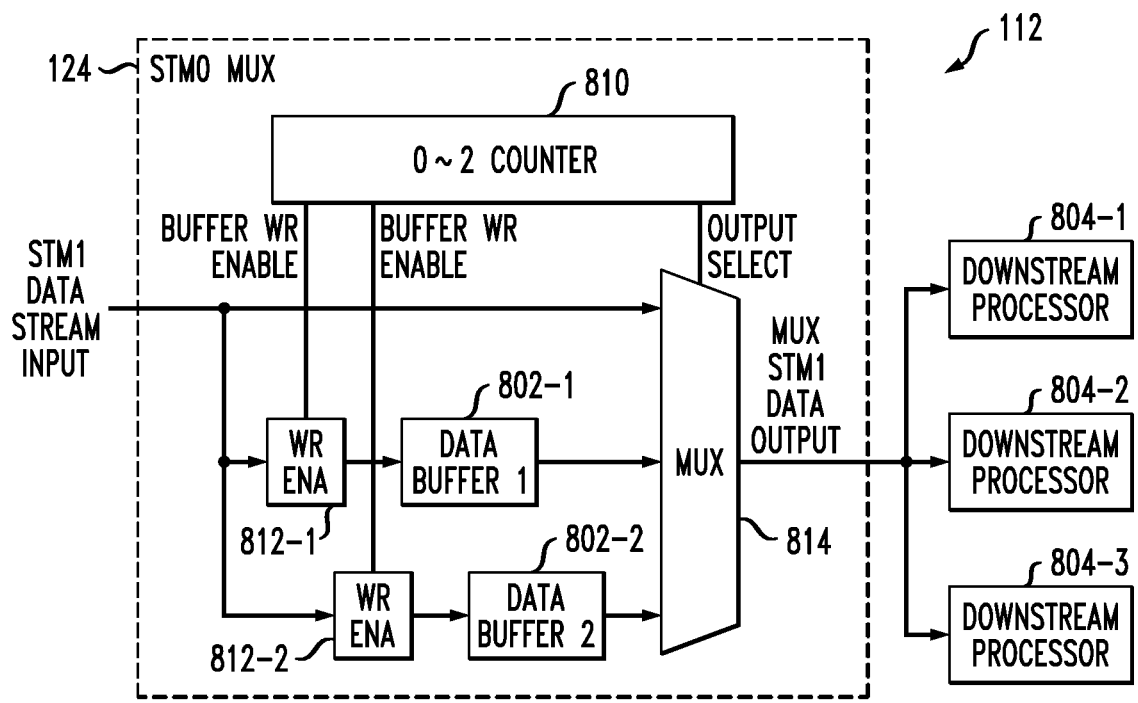
FIG. 8 shows synchronous transport signal multiplexing circuitry of a physical layer device in the FIG. 1 system.

One embodiment of the multiplexing circuitry 124 of the mapper 112 is illustrated in FIG. 8. In this embodiment, the multiplexing circuitry comprises FIFO data buffers 802-1 and 802-1, and drives downstream processors 804-1, 804-2 and 804-3 of the mapper 112, each associated with one of the synchronous transport signals STM0#1, STM0#2 and STM0#3. The multiplexing circuitry 124 further comprises a counter 810, write enable elements 812-1 and 812-2 coupled to respective inputs of the buffers 802-1 and 802-2, and a multiplexer 814. The counter 810 counts from 0 to 2 and generates a buffer write enable signal for application to the write enable elements 812 and an output select signal for application to a select line of the multiplexer 814. One of the inputs of the multiplexer 814 is coupled to an STM1 data stream input of the multiplexing circuitry 124, and the other two inputs of the multiplexer are coupled to respective outputs of the buffers 802-1 and 802-2. The output of the multiplexer 814 provides the multiplexed STM1 data output comprising the three STM0 signals for delivery to the respective downstream processors 804-1, 804-2 and 804-3.

It is to be appreciated that the particular circuitry arrangements shown in FIGS. 4B, 6B and 8, the signaling arrangements illustrated in the timing diagrams of FIGS. 4C and 6C, and the process steps of FIGS. 5 and 7, may be varied in other embodiments. Numerous alternative arrangements of circuitry, signal timing and process flow may be used to implement the described drop and insert functionality.

Also, although described primarily in the context of POH information of a VC4 frame, the disclosed techniques can be adapted for use with a wide variety of other types of synchronous transport signal information.

It should be noted that the portions of the reframing circuitry 110, and possibly other components of the node 102, may be implemented at least in part in the form of one or more software programs running on a processor. A memory associated with the mapper 112, link layer processor 114 or host processor 116 may be used to store executable program code of this type. Such a memory is an example of what is more generally referred to herein as a "computer program product" having executable computer program code embodied therein. The computer program code when executed in a mapper, link layer processor or other communication device processor causes the device to perform one or more operations associated with reframing circuitry 110. Other examples of computer program products in embodiments of the invention may include, for example, optical or magnetic disks.

Also, reframing circuitry in accordance with embodiments of the invention may be implemented as part of an integrated circuit device suitable for installation on a line card or port card of a router, switch, network element or other communication device. Numerous other configurations are possible.

In a given integrated circuit implementation, identical die are typically formed in a repeated pattern on a surface of a semiconductor wafer. Each die includes reframing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

Again, it should be emphasized that the embodiments described herein are intended to be illustrative only. For example, the particular arrangement of physical layer device, link layer device, host processor and other elements as shown in FIG. 1 may be varied in alternative embodiments. Also, the particular signals shown in the drawings and described above are presented by way of example, and those skilled in the art will recognize that alternative signal configurations and associated timing arrangements may be used. Furthermore, other types of circuitry may be used to implement reframing functionality as disclosed herein. These and numerous other alternative embodiments within the scope of the following claims will be readily apparent to those skilled in the art.

What is claimed is:

1. An apparatus comprising:
reframing circuitry adapted to control one or more communications between a physical layer device and a link layer device;
wherein the physical layer device has a container frame interface but not a virtual container frame interface;
wherein in a first direction of communication the reframing circuitry receives a container frame from the container frame interface of the physical layer device with the container frame having a first arrangement of columns comprising a path overhead column;
the reframing circuitry being configured to output a virtual container frame;
wherein the virtual container frame provided by the reframing circuitry includes a modified version of the container frame with the modified version of the container frame having a second arrangement of columns different than the first arrangement of columns; and
wherein the second arrangement of columns comprises a reordering of payload information columns of the first arrangement of columns.

2. The apparatus of claim 1 wherein the reframing circuitry outputs the virtual container frame to the link layer device.

3. An apparatus comprising:
reframing circuitry adapted to control one or more communications between a physical layer device and a link layer device;
wherein in a first direction of communication the reframing circuitry receives a container frame with the container frame having a first arrangement of columns;
the reframing circuitry being configured to output a virtual container frame;
wherein the virtual container frame provided by the reframing circuitry includes a modified version of the container frame with the modified version of the container frame having a second arrangement of columns different than the first arrangement of columns;
wherein the reframing circuitry receives the container frame from the physical layer device and outputs the virtual container frame to the link layer device; and
wherein the physical layer device comprises a legacy mapper integrated circuit having a container frame interface but not a virtual container frame interface, and wherein the reframing circuitry is configured to allow the container frame interface of the legacy mapper integrated circuit to communicate with a virtual container frame interface of the link layer device.

4. The apparatus of claim 1 wherein the reframing circuitry in generating the modified version of the container frame is operative to remove the path overhead column of the container frame and to replace that path overhead column with a stuff column in the modified version of the container frame.

5. The apparatus of claim 4 wherein the reframing circuitry outputs the virtual container frame such that the virtual container frame includes the path overhead column that was removed from the container frame in generating the modified version of the container frame.

6. The apparatus of claim 4 wherein the reframing circuitry in generating the modified version of the container frame is operative to reorder multiple synchronous transport signal data columns of the container frame.

7. The apparatus of claim 1 wherein the first arrangement of columns further comprises the path overhead column, followed by a single stuff column, followed by a sequence of multiple synchronous transport signal data columns that repeats in accordance with a first designated order.

8. The apparatus of claim 7 wherein the multiple synchronous transport signal data columns comprise a sequence of three STM0 signal byte columns denoted STM0#1, STM0#2 and STM0#3 that repeats in the first designated order, where the first designated order is one of STM0#2, STM0#1, STM0#3 and STM0#2, STM0#3, STM0#1.

9. The apparatus of claim 7 wherein the second arrangement of columns comprises two stuff columns followed by a sequence of multiple synchronous transport signal data columns that repeats in accordance with a second designated order different than the first designated order.

10. The apparatus of claim 9 wherein the multiple synchronous transport signal data columns comprise a sequence of three STM0 signal byte columns denoted STM0#1, STM0#2 and STM0#3 that repeats in the second designated order, where the second designated order is STM0#1, STM0#2, STM0#3.

11. An apparatus comprising:
reframing circuitry adapted to control one or more communications between a physical layer device and a link layer device;
wherein in a first direction of communication the reframing circuitry receives a container frame with the container frame having a first arrangement of columns;
the reframing circuitry being configured to output a virtual container frame;
wherein the virtual container frame provided by the reframing circuitry includes a modified version of the container frame with the modified version of the container frame having a second arrangement of columns different than the first arrangement of columns;
wherein the reframing circuitry receives the container frame from the physical layer device and outputs the virtual container frame to the link layer device; and
wherein in a second direction of communication the reframing circuitry receives from the link layer device a virtual container frame comprising a container frame with the container frame having the second arrangement of columns;
the reframing circuitry being configured to output to the physical layer device a modified version of the container frame;
wherein the modified version of the container frame provided by the reframing circuitry to the physical layer device has the first arrangement of columns.

12. The apparatus of claim 11 wherein the reframing circuitry in generating the modified version of the container frame removes a path overhead column of the virtual container frame and replaces a stuff column of the container frame with the removed path overhead column in the modified version of the container frame.

13. The apparatus of claim 11 wherein the reframing circuitry in generating the modified version of the container frame reorders multiple synchronous transport signal data columns of the container frame.

14. An integrated circuit comprising the apparatus of claim 1.

15. A communication system comprising:
a plurality of communication devices arranged in one or more networks;

at least one of said communication devices comprising:

a physical layer device;

a link layer device; and reframing circuitry adapted to control one or more communications between the physical layer and link layer devices;

wherein the physical layer device has a container frame interface but not a virtual container frame interface;

wherein in a first direction of communication the reframing circuitry receives a container frame from the container frame interface of the physical layer device with the container frame having a first arrangement of columns comprising a path overhead column;

the reframing circuitry being configured to output a virtual container frame;

wherein the virtual container frame provided by the reframing circuitry includes a modified version of the container frame with the modified version of the container frame having a second arrangement of columns different than the first arrangement of columns; and wherein the second arrangement of columns comprises a reordering of payload information columns of the first arrangement of columns.

16. The system of claim 15 wherein the physical layer device comprises a legacy mapper integrated circuit, and wherein the reframing circuitry is configured to allow the container frame interface of the legacy mapper integrated circuit to communicate with a virtual container frame interface of the link layer device.

17. The system of claim 15 wherein the reframing circuitry is implemented within one of the physical layer device and the link layer device.

18. A method comprising:

receiving in a first direction of communication between a physical layer device and a link layer device a container frame;

wherein the physical layer device has a container frame interface but not a virtual container frame interface;

wherein the container frame is received from the container frame interface of the physical layer device, with the container frame having a first arrangement of columns comprising a path overhead column;

generating a virtual container frame that includes a modified version of the container frame with the modified version of the container frame having a second arrangement of columns different than the first arrangement of columns; and outputting the virtual container frame;

wherein the second arrangement of columns comprises a reordering of payload information columns of the first arrangement of columns.

19. The method of claim 18 wherein the generating step further comprises:

removing the path overhead column of the container frame;

replacing the removed path overhead column with a stuff column in the modified version of the container frame;

configuring the virtual container frame to include the removed path overhead column; and reordering multiple synchronous transport signal data columns of the container frame.

20. A computer program product comprising a non-transitory computer-readable storage medium having executable computer program code embodied therein, wherein the computer program code when executed in a communication device causes the device to perform the steps of the method of claim 18.

* * * * *